United States Patent

Shohet et al.

[15] 3,678,691

[45] July 25, 1972

[54] CONVERTIBLE COMPOSITE ENGINE CONTROL

[72] Inventors: Herbert N. Shohet, Norwalk; Joseph L. Magri, Shelton, both of Conn.

[73] Assignee: United Aircraft Corporation, East Hartford, Conn.

[22] Filed: July 10, 1970

[21] Appl. No.: 53,721

[52] U.S. Cl. ............................60/239, 60/39.33, 60/39.25, 60/39.28, 60/226, 60/39.17, 60/263
[51] Int. Cl. ............................................................F02k 1/18
[58] Field of Search ........................................60/39.16, 39.28

[56] References Cited

UNITED STATES PATENTS

| 3,465,526 | 9/1969 | Emerick | 60/39.16 X |
|---|---|---|---|
| 3,449,914 | 6/1969 | Brown | 60/39.16 X |
| 3,514,952 | 6/1970 | Schumacher | 60/39.16 X |
| 3,423,048 | 1/1969 | Clarke | 60/39.16 X |
| 3,472,487 | 10/1969 | Moellmann | 60/39.16 X |
| 3,508,395 | 4/1970 | Sebestyen | 60/39.16 X |
| 3,520,138 | 7/1970 | Fox | 60/39.16 X |

Primary Examiner—Carlton R. Croyle
Assistant Examiner—Robert E. Garrett
Attorney—Vernon F. Hauschild

[57] ABSTRACT

A control for a convertible composite engine having variable area inlet free turbines driven by a gas generator so that the composite engine is capable of powering a vehicle, such as a flight vehicle, in more than one mode of operation. The control includes provisions for regulating fuel flow to the gas generator in response to the requirements of one of the free turbines and to position the variable geometry inlet thereto in response to fuel flow and also includes provisions for simultaneously regulating fuel flow to the gas generator in response to the power requirements of the other free turbine and varying the area of the variable geometry inlet thereto in response to fuel flow, and still further includes apparatus for positioning a variable area exhaust nozzle operatively associated with one of the free turbines.

17 Claims, 4 Drawing Figures

Patented July 25, 1972
3,678,691
2 Sheets-Sheet 1
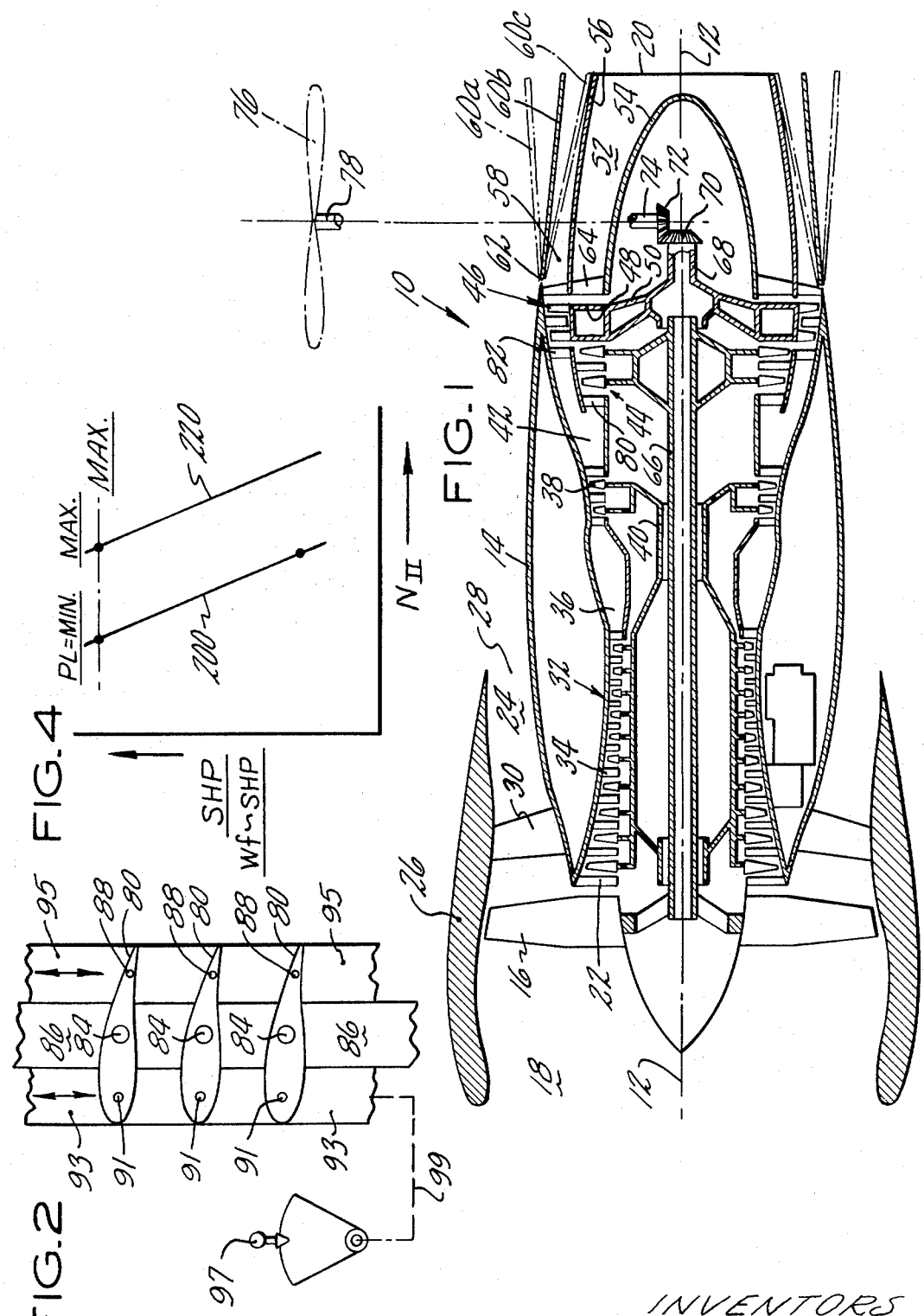
INVENTORS
HERBERT N. SHOHET
JOSEPH L. MAGRI
BY Vernon F. Hauschild
ATTORNEY

CONVERTIBLE COMPOSITE ENGINE CONTROL

CROSS-REFERENCE TO RELATED APPLICATIONS

An application is being filed on even date in the names of coinventors Herbert N. Shohet, Joseph L. Magri and Edward R. Primachuk entitled "Convertible Composite Engine" and claiming the convertible composite engine disclosed herein.

BACKGROUND OF THE INVENTION

1. Field of Invention

This invention relates to engine controls and more particularly to the control of a convertible composite engine which utilizes a gas generator to selectively drive variable inlet free turbines for different vehicle modes of operation. Each of the free turbines can be powered at zero or full power or any combination therebetween and can be powered simultaneously in accordance with the power requirements of each. Engine control is accomplished by means of selectively metering fuel to the gas generator and selectively varying the area of the inlet of the free turbine in response to the power requirements of that free turbine.

2. Description of the Prior Art

While the prior art includes several patents relating to controlling the flow of fuel to a gas turbine engine, the prior art is lacking a control for a convertible composite engine of the type described above since such an engine is believed not to be known in the prior art.

SUMMARY OF THE INVENTION

A primary object of the present invention is to power and control a vehicle, such as a flight vehicle, through a convertible composite engine including a gas generator driving two free turbines such that the vehicle can operate between zero and 100 percent power in either of the two modes powered by independent free turbines, and wherein the free turbines can be powered simultaneously to effect sharing of the gas generator gas power output to permit powering of the vehicle by combined use of both modes of operation simultaneously.

In accordance with the present invention, the fuel flow to the free turbines driving gas generator is controlled as a function of the power requirements of the free turbine being used in the mode of operation of interest and the area of the variable geometry inlet to that free turbine is simultaneously positioned as a function of fuel flow to the gas generator.

In accordance with a further aspect of the present invention, fuel flow can be regulated to the gas generator as a function of the partial requirement of both free turbines, simultaneously.

In accordance with still a further aspect of the present invention, a fuel flow limiting device, such as a topping valve, is provided to insure that the gas generator does not exceed its operating limits in such parameters as speed and temperature.

In accordance with still a further aspect of the present invention, the variable area exhaust nozzle operatively associated with at least one of the free turbines is controlled as a function of fuel flow demands thereof.

In accordance with still a further aspect of the present invention, a convertible composite engine control is provided in which one of the free turbines is being controlled by a closed loop system and the other free turbine is being controlled by an open loop system.

BRIEF DESCRIPTION OF THE DRAWINGS

FIG. 1 is a cross-sectional showing of the convertible composite engine.

FIG. 2 is a perspective partial showing of a variable area inlet guide vane or nozzle ring illustrating apparatus for varying the position of the individual guide vanes simultaneously.

FIG. 4 is a performance chart of engine operation during the shaft horsepower mode.

DESCRIPTION OF THE PREFERRED EMBODIMENT

Figure 3:
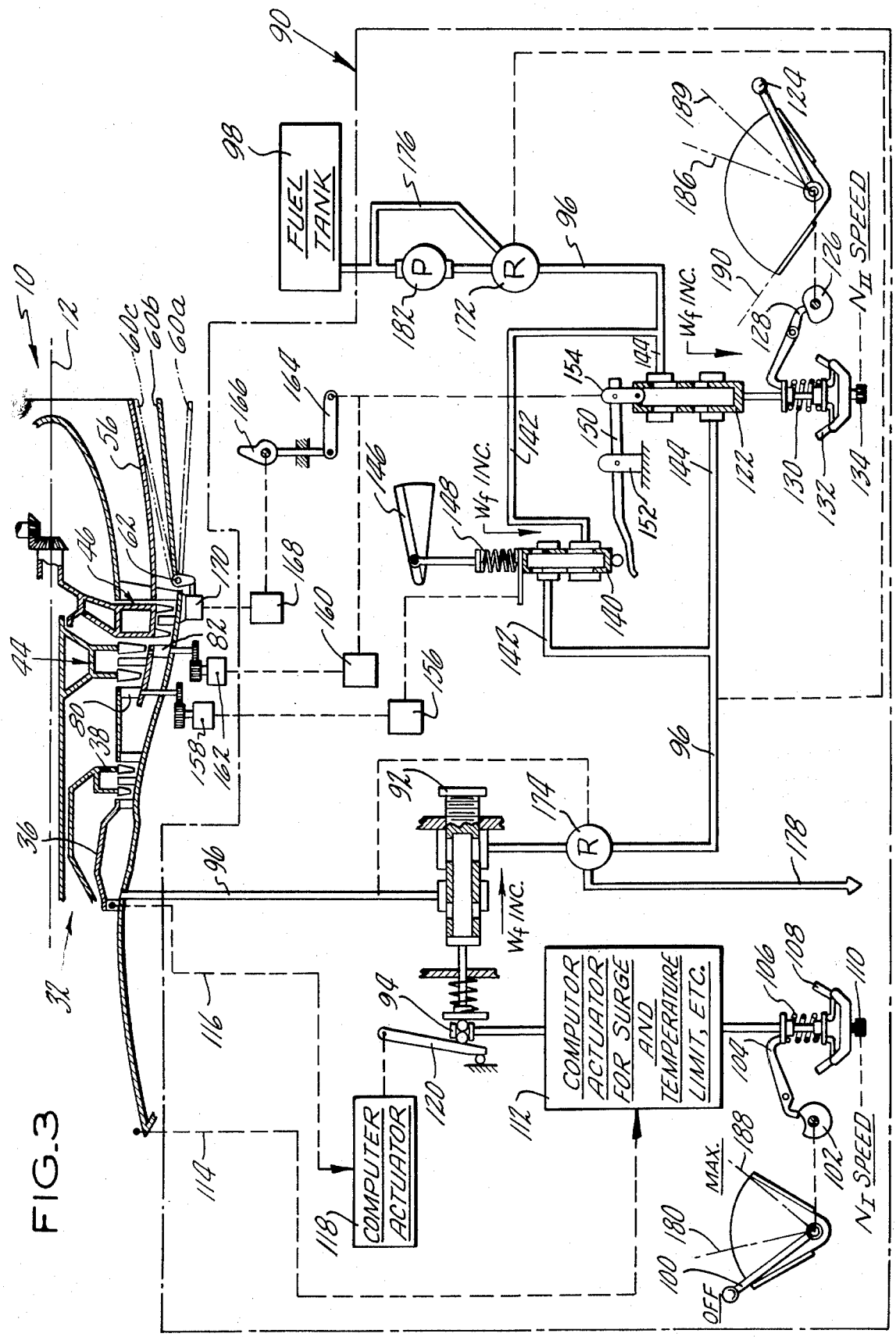
FIG. 3 is a schematic showing of the control for the composite engine.

Referring to FIG. 1 we see the convertible composite engine 10 which is concentric about centerline or axis 12. Engine case 14 envelopes most of the composite engine except bypass fan or compressor 16. Engine 10 has forward end or inlet 18 and after end or outlet 20. It will be noted that fan 16 is positioned forward of the inlet 22 of engine case 14 and is mounted for rotation so as to generate and pump compressed air in thrust generating fashion through annular passageway 24 which may be convergent and culminates in fan discharge outlet 28 and which is defined between engine housing 14 and fixed shroud 26. Support members 30 serve to support fixed shroud 26 from engine case 14.

Gas generator 32 is located in the forward portion of engine casing 14 and mounted for rotation concentrically about axis 12 and comprises compressor section 34, combustion section 36 and turbine section 38. The air which enters inlet 22 is compressed in passing through compressor section 34, has heat added thereto in passing through combustion section 36, has energy extracted therefrom in passing through turbine section 38 in a sufficient amount so that turbine 38 drives compressor 34 through connection shafting 40. While gas generator 32 is illustrated to be of the single spool axial flow variety, it will be evident to those skilled in the art that it could be of the twin-spool axial variety, centrifugal flow, or other conventional gas generator configurations. The pressurized and heated gases which are generated by gas generator 32 are then passed through annular passage 42 to either or both free turbines 44 and 46. It will be noted that free turbines 44 and 46 are in parallel flow relation to one another so that the gases from the gas generator 32 can be passed partially through both simultaneously or either totally as desired. The gases which power free turbine 44 pass through apertures 48 in the disc 50 of turbine 46 and then pass to atmosphere through the inner annular passageway 52 defined between tailcone or center body 54 and exhaust duct 56. Although shown as fixed in FIG. 1, exhaust duct 56 may be variable similarly to 60. The gases which power free turbine 46 are passed to atmosphere through the variable area, annular passage 58 defined between exhaust duct 56 and variable area exhaust duct 60, which consisted in conventional fashion of a series of overlapping flaps pivotally connected at pivot points 62 circumferentially about engine casing 14. Support struts 64 support duct 56 and centerbody 54 from engine case 14, which is in turn supported from the aircraft in conventional fashion.

Free turbine 44, which is the fan free turbine and shown to be of but not limited to the two-stage variety, is mounted for rotation concentrically about axis 12 and is connected by thru-shaft 66 to drive fan 16. Free turbine 46, which is the shaft horsepower generating free turbine, includes rearwardly projecting drive or output shaft 68 positioned concentrically about axis 12 and which carries bevel gear 70. Bevel gear 70 matingly engages bevel gear 72 of shaft horsepower take-off means 74, which is typically operatively connected in conventional fashion to drive helicopter rotor drive shaft 78 and hence helicopter rotor 76.

It is important to note that fan 16, gas generator 32, free turbines 44 and 46 are positioned in axial alignment along axis 12 and are mounted for rotation concentrically thereabout through conventional bearing support means. All other portions of engine 10 are also concentric with respect to axis 12, including fixed shroud 26, engine case 14, centerbody 54, fixed exhaust duct 56, and variable area exhaust duct 60.

A ring of variably positionable inlet guide vanes 80 and 82, or other variable geometry mechanism, are positioned at the inlet to free turbines 44 and 46, respectively, and may be operated in any manner, such as is shown in FIG. 2 and to be described hereinafter, so as to provide a variable area inlet to the free turbines 44 and 46. Accordingly, the exhaust gases from gas generator 32 can pass through free turbine 44 exclusively when inlet guide vanes 80 are open and inlet guide vanes 82 are closed-off. When in this condition, the engine is operating entirely in thrust mode of operation with free turbine 44 driving by-pass fan 16. Further, with inlet guide vanes 80 closed-off and inlet guide vanes 82 open, all of the gas generator exhaust gases pass through free turbine 46 so that the convertible composite engine 10 is then operating in the shaft horsepower mode of operation which, in this instance, is the helicopter mode of operation. With variable area inlet guide vanes 80 and 82 at selected intermediate positions, the amount of exhaust gas from the gas generator 32 being passed through free turbines 44 and 46 can be accurately controlled, and in this fashion, the power split between the turbines 44 and 46 can be controlled.

As best shown in FIG. 2, inlet guide vanes 80 or 82, which extend in a ring concentrically about axis 12 in annular gas flow passage 42, can be fabricated and actuated in any convenient manner. For example, the vanes 80, or 82, can be pivotally connected at pivot points 84 to fixed ring 86 and pivotally connected at pivot points 88 and 91 to movable rings 93 and 95 so that, as rings 93 and 95 are caused to rotate in opposite directions, conceivably through pilot operated hand lever 97 connected thereto by conventional mechanism 99, the variable inlet guide vanes, 80 or 82, can be caused to change position in unison and thereby vary the area of the inlet to turbines 44 and 46 from a fully closed to a fully open position and all intermediate positions therebetween. It will therefore be seen that, due to the parallel flow orientation between turbines 44 and 46, all of the exhaust gas from gas generator 32 can be passed through turbine 44 for complete thrust generating mode operation, all of the exhaust gases can be passed through turbine 46 for complete shaft horsepower mode of operation and, with the inlet guide vanes 80 and 82 in intermediate positions, a power sharing or splitting of the exhaust generated gases occurs between the turbines so that partial thrust generation and partial shaft horsepower operation is accomplished.

The variable area inlet guide vanes 80 and 82 not only accomplish the aforementioned power splitting function but also maintain high turbine efficiencies during power-split operations by varying the turbine inlet nozzle areas to optimize the angle and flow velocity of the gases from gas generator 32 entering the turbines 44 and 46.

Referring to FIG. 3 we see our engine control or fuel control 90, which serves to control fuel flow to the gas generator 32 and to position inlet guide vanes 80, 82 and variable area exhaust nozzle 60. Control 90 consists of gas generator fuel metering or control valve 92, which is positioned by multiplier 94 and lever 120 and is located in fuel line 96 to regulate the flow of fuel from fuel tank 98 to the gas generator 32. Valve 92 is essentially a limiting valve and serves to protect the gas generator 32 so that it does not exceed its safe operating limits. The position of valve 92 is determined, in concert with other means hereinafter described, by gas generator condition lever 100, which acts through cam 102 and pivot link 104 to impose a load upon positioning spring 106 of flyball governor 108. Governor 108 has a gas generator speed $N_I$ responsive load imposed thereon in opposition to spring 106 so as to position the roller members of multiplier 94. This gas generator speed $N_I$ input is imparted to positioning spring 106 since flyball governor 108 is driven as a function of gas generator speed $N_I$ by input gear 110 which is operatively connected to be driven at or as a function of a gas generator speed $N_I$.

Computer actuator 112, of conventional design, is programmed to limit the positioning of fuel flow valve 92 so as to cause gas generator 32 to remain within its surge, speed and temperature limits, and receives a gas generator inlet temperature signal from line 114. Computer actuator 112 positions multiplier 94 with the control limit signal which is limiting fuel flow, ($W_f$) limit, divided by compressor discharge pressure, CDP, or ($W_f$/CDP) limit. The parameter compressor discharge pressure (CDP) is fed to multiplier 94 through signal line 116 to computer actuator 118 which, in turn, positions pivot lever 120 so that the net input positioning signal to gas generator fuel valve 92 is then gas generator fuel flow limit, ($W_f$) limit.

Shaft horsepower turbine fuel control valve 122 serves to control fuel flow therethrough from fuel tank 98 to gas generator 32, through valve 92, as a function of shaft horsepower turbine 46 requirement and within the overall limit established by valve 92, as hereinbefore described. The shaft horsepower free turbine 46 rotational speed $N_{II}$ causes governor 132 to rotate at or as a function of turbine 46 speed by causing input drive member 134 to rotate at that speed. The shaft power turbine speed selector lever 124, which acts through cam 126 and pivot link 128, imparts a positioning force to spring 130 in opposition to free turbine 46 speed responsive positioning force imparted thereto by flyball governor 132 so as to establish a selected flyball governor 132 rotational speed.

Changes in flyball governor 132 rotational speed, caused by varying shaft horsepower loads on the free turbine 46, reposition the metering valve 122 providing the gas generator 32 with fuel flow as a function of shaft horsepower demanded from the power turbine 46. This operation is known as "closed loop feedback" or "demand" type of gas turbine engine control typical of conventional turbo-shaft engines.

Fan turbine 44 is controlled by fan turbine fuel metering or control valve 140, which is positioned in fuel line 142 in parallel with valve 122 in fuel line 144 so as to provide fuel flow from fuel tank 98 therethrough to gas generator 32 as a function of the position thereof. The position of fan turbine fuel flow metering valve 140 is determined by the position of pilot operated fan turbine lever 146, which imparts a positioning force to valve 140 through overriding spring 148. Lever 146, therefore, directly controls the fuel entering gas generator 32, within the overall limit established by valve 92, and the fan thrust developed by the convertible composite engine 10. This operation is known as "direct" or "open loop" type of gas turbine engine control typical of conventional turbofan or turbojet engines. Override lever 150, pivotally supported at pivot point 152 is positioned by metering valve 122 through link 154 to permit valve 122 to transmit the amount of fuel required by the shaft power turbine 46 regardless of the fuel setting of metering valve 140. Override lever 150 thus acts as a variable limit on fan fuel valve 140 so that in the competition between it and shaft fuel valve 122 for a proportionate part of the total fuel flow permitted by limiting valve 92, valve 122 always takes precedence. It is noted that this preferential treatment is provided in anticipation of the use of this convertible composite engine in a compound helicopter where adequate power to the lifting rotor in preference to the forward propulsion fan is mandatory. In other applications, override lever 150 may be deleted or applied oppositely.

It is very important to note that fan valve 140 is connected through signal amplifier 156 to conventional actuator mechanism 158, which may be hydraulically, electrically, or pneumatically actuated in conventional fashion to position the various vanes of variable area inlet guide vane ring 80 as a function of the position of fan fuel control valve 140 and hence fuel flow therethrough. In similar fashion, shaft horsepower valve 122 is connected through signal amplifier 160 through conventional actuator mechanism 162 to position the various vanes of variable area inlet guide vane ring 82 as a function of the position of shaft horsepower valve 122, and hence is a function of the fuel flow to the gas generator therethrough.

It should further be noted that pivot link 164 and selectively contoured cam 166 are positioned by shaft horsepower valve 122 and work through signal amplifier 168 to position variable area exhaust duct or nozzle 60 through conventional actuators 170, which may be of the electrical, hydraulic or pneumatic variety and serve to cause the overlapping flaps of nozzle 60 to pivot about their support pivot points 62 to vary the area of passage 58.

Fuel regulators 172 and 174 serve in conventional fashion to regulate the fuel pressure drop across valves 122 and 140, and valve 92, respectively, and cause excess fuel to be bypassed back to the inlet of pump 182 through by-pass fuel lines 176 and 178, respectively, so that the fuel flow through these valves is directly proportional to valve position since the position of the valves determines the area of the metering orifices which the valves define.

OPERATION OF CONTROL

To demonstrate the operation of control 90, it will now be described as controlling convertible composite engine 10 of the type shown in FIG. 1 in which power turbine 44 drives the thrust generating fan 16 and power turbine 46 drives the helicopter rotor 76.

To start the engine, speed selector lever 124 is first placed in its ground idle position 189. This causes the fuel metering valve 122 and the power turbine variable inlet guide vanes 82 to move into their ground idle position and also causes the variable exhaust nozzle to assume position 60b. While a flow of fuel when established is now able to pass through metering valve 122, actual fuel flow to the engine is dependent upon actuation of gas generator lever 100. Placement of lever 100 in its ground idle position 180, imposes a positioning force on spring 106, which will eventually be balanced by the gas generator speed $N_I$ feedback force which drives speed responsive governor 108. Lever 100, in this fashion, serves to position gas generator fuel metering valve 92. An engine starter, not shown but conventional in design, serves to turn over gas generator 32 and drive fuel pump 182. Conventional ignition means are used to ignite the fuel within combustion section 36 of gas generator 32 with the fuel being introduced thereinto from fuel tank 98 through pump 182, fuel pressure regulator 172, shaft horsepower valve 122, which is positioned to admit the required amount of fuel therethrough during engine starting, through fuel pressure regulator 174 and gas generator fuel regulating valve 92 into the combustion section 36 of gas generator 32 in conventional fashion. With the engine ignited and operating at idle condition, the engine per se now serves to drive fuel pump 182.

In this description, it should be understood that the placement of speed selector lever 124 in its start position 189 may be accomplished manually or automatically by an interlock arrangement (not shown), or equivalent, with gas generator lever 100 during the starting sequence.

For take-off, the helicopter mode of aircraft operation is used. To make available the shaft horsepower required by the helicopter rotor, the shaft power turbine speed selector lever 124 may be set at an operating position, such as station 186, and gas generator condition lever 100 is positioned at its full open or maximum position at station 188. During the starting operation and this take-off condition, fan lever 146 is positioned such that fan fuel control valve 140 and inlet guide vanes 80 are in their fully closed position. The positioning of the power turbine speed selector lever 124 at the station 186 position serves to open the variable exhaust nozzle to position 60a, and shaft horsepower metering valve 122 and inlet guide vanes 82 as previously described such that fuel is being regulated through valve 122 and provided to gas generator 32 as a function of valve 122 position. The operation of gas generator 32, with inlet guide vanes 82 in their open position, will serve to drive free turbine 46, which in turn drives helicopter rotor 76, which is in its minimum pitch, minimum power condition.

When the helicopter rotor comes up to speed, rotor blade pitch is increased to take work out of the helicopter rotor and this serves to reduce the speed of the helicopter rotor and the shaft horsepower free turbine 46. From an operation standpoint, it can be considered that the engine has been operating as shown on the engine operation chart in FIG. 4 along minimum speed line 200 which for purposes of this description is understood to coincide with lever position 186. As stated above, increasing the helicopter rotor blade pitch causes helicopter rotor and free turbine 46 speed to be reduced. Due to the shaft horsepower free turbine speed $N_{II}$ feedback to speed responsive governor 132 via drive 134, governor 132 and spring 130 act to reposition regulating valve 122 so as to increase fuel flow therethrough to gas generator 32. The effect is to bring engine operation into a stabilized condition along minimum speed line 200 at the shaft horsepower level required by the power turbine 46. With shaft horsepower fuel regulating valve 122 in this new position, valve 122 is doing the regulating of the fuel flow between fuel tank 98 and gas generator 32. The gas generator fuel regulating valve 92 is not serving to regulate fuel flow in this helicopter mode of operation, unless one of the gas generator parameters being controlled thereby, such as speed or temperature, exceeds its preselected computer setting. If the speed selector lever 124 had been moved to position 190 in FIG. 3, corresponding to maximum shaft power turbined governed speed setting, the engine would have operated along line 220 shown in FIG. 4. Our control 90 can well be used with conventional automatic speed reset features which are not disclosed herein since they are not considered to be a part of this invention, but these conventional systems when utilized with our disclosed fuel control system would add automatic ultimate positioning of shaft horsepower fuel regulating valve 122 to maintain constant power turbine 46 rotational speed, as established by the position of speed selector lever 124, for all levels of shaft horsepower demanded from the power turbine 46 by the helicopter rotor.

Initiation of fan thrust required to transition the aircraft to fan mode of operation is accomplished by actuating lever 146 to open fan turbine fuel regulating valve 140 and inlet guide vanes 80 to a selected position so that gas generator 32 is receiving fuel from tank 98 through parallel fuel regulating valves 122 and 140 simultaneously. During this transition period, we are operating partially in the helicopter mode and partially in the thrust mode and the gas power of the gas generator 32 is being split between the free turbines 44 and 46. In this transitory or two-mode operation, the demands of helicopter rotor 76 continue to dictate the position of fuel regulating valve 122 and the position of pilot operated lever 146 continues to regulate the position of fan fuel metering valve 140 so that the total amount of fuel being passed through both valves is being provided to the gas generator 32 through gas generator fuel regulating valve 92. Regulating valve 92, however, will serve to insure that the operating limits of the gas generator 32 are not exceeded due to the joint demands of the fan 16 and the rotor 76. Also, as previously explained, overriding lever 150 prevents excessive inputs to the fan turbine fuel metering valve 140 from limiting the ability of fuel metering valve 122 to meet the fuel (power) demands of power turbine 46. It is to be understood, however, that as the aircraft transitions from take off or hover into forward flight, the requirement of rotor 76 for power and fuel diminishes thus reducing the restriction by override lever 150 on the amount of fuel passed by fan fuel valve 140.

As previously explained, the position of variable area exhaust nozzle 60 is determined by the position of shaft horsepower fuel regulating valve 122. During the engine starting operation, lever 124, and therefore, valve 122 and variable inlet guide vanes 82, is placed in ground idle 189 position and the exhaust nozzle 60 assumes the partially open cruise position 60b. Actual fuel flow to the engine is initiated when lever 100 is moved out of "off" position. When the engine is operating in the pure shaft horsepower mode, such as for take off, the variable area nozzle is in the fully open position 60a. When the engine is operating in cruise condition, the variable area nozzle is in its intermediate or cruise position 60b. If the aircraft is to be operated fully in the fan mode with the rotor 76 of the helicopter stopped or stowed, the power turbine speed selector lever 124 would be moved to its shut-off position so as to stop fuel flow through shaft horsepower fuel regulating valve 122, close off inlet guide vanes 82 and move exhaust nozzle to its closed position 60c, and engine 10 would be controlled through lever 146 to position valve 140 and drive free turbine 44 as a function of lever 146 position.

While we have disclosed a control in which the area of the variable area exhaust nozzle 60 is controlled as a function of the position of the fuel flow regulating valves 122 and 140, it will be evident to those skilled in the art that the area of the exhaust nozzle 60 could have been controlled in a variety of other ways, for example, as a function of the relative position of the inlet guide vanes of the two free turbines or as a function of the total pressure of the engine air flow in the area just upstream of the inlet guide vanes of the two free turbines, both by the use of conventional mechanisms. Both the relative positions of the free turbine inlet guide vanes and the relative total pressures upstream thereof is determined by and hence responsive to fuel control 90.

When we are operating in the pure thrust mode of operation, our convertible composite engine 10 is being controlled by an "open loop" direct-control system.

As previously explained, this means the pilot of the aircraft directly controls the power (thrust) output of his engine without regard for its internal conditions except for conventional endurance and safety limits by direct control of fuel flow.

When we are in the pure shaft horsepower or helicopter mode of engine operation, engine 10 is controlled by a "closed loop feedback" power demand control system. Also as previously explained, this means that the pilot sets the governor 132, that controls the nominal rotative speed of the engine output shaft to the helicopter rotor, to the desired operating speed and the engine automatically responds to changes in power demand imposed by the pilot via conventional aircraft flight controls to maintain the rotor system at the original nominal speed setting.

When the vehicle powered by our convertible composite engine 10 is in the helicopter mode of operation, the vehicle is controlled by a conventional helicopter flight control system which form no part of this invention. The engine control system 90 taught herein operates independently of the helicopter flight control system except as described above. Similarly, when the vehicle is in pure thrust, fixed wing mode of operation, vehicle flight control is accomplished by conventional fixed wing flight controls which form no part of this invention and which are independent of the engine control system 90 taught herein. It is important to understand that, consequently, this engine presents no unconventional engine or aircraft controls to the pilot, that it can be operated in pure thrust or pure shaft power modes or any proportion of both, that transfer from one mode to the other or operation at either mode or combination is smooth and requires no unusual or unconventional levers or manipulations, and that no special training is required for an average pilot to use them.

We wish it to be understood that we do not desire to be limited to the exact details of construction shown and described, for obvious modifications will occur to a person skilled in the art.

We claim:

1. A control for a convertible composite engine having a gas generator driving two free power turbines mounted in parallel flow relation and with variable area inlet guide vanes for each turbine and with a variable area exhaust nozzle for at least one of the power turbines including:
   A. means to regulate the engine having:
      1. first means to regulate the amount of fuel flow to the gas generator when the gas generator is driving one of the free turbines,
      2. second means to regulate the amount of fuel flow to the gas generator when the gas generator is driving the other free turbine,
      3. means to control the inlet area defined by the one free turbine inlet guide vanes when the gas generator exhaust gases are being passed therethrough and to independently vary the inlet guide vanes of the other free turbine throughout their complete operating range,
      4. means to control the area defined by the inlet guide vanes of the other free turbine as the gas generator exhaust gases are being passed therethrough and to independently vary the inlet guide vanes of the one free turbine throughout their complete operating range.

2. Apparatus according to claim 1 and including means to control the fuel flow of the gas generator in simultaneous response to the first and second fuel flow regulating means including means to vary the area of the inlet guide vanes of each free turbine in proportion to the fuel flow being regulated through its flow regulating means.

3. Apparatus according to claim 2 and including means responsive to one of said flow control regulator means to vary the area of the variable area exhaust nozzle.

4. A control for a convertible composite engine which includes a gas generator powering variable geometry inlet free turbines and with a variable area exhaust nozzle operatively connected with the free turbines including:
   A. means to regulate fuel flow to the gas generator,
   B. means to regulate the gas generator exhaust gas flow through the free turbines in response to fuel flow so regulated, and
   C. means responsive to the fuel flow regulating means to selectively position the variable area exhaust nozzle.

5. A control for a convertible composite engine having a gas generator driving two free power turbines with variable area inlets and with a variable area exhaust nozzle for at least one of the power turbines including:
   A. means to regulate the engine having:
      1. first means to regulate the amount of fuel flow to the gas generator when the gas generator is driving one of the free turbines,
      2. second means to regulate the amount of fuel flow to the gas generator when the gas generator is driving the other free turbine,
      3. means to control the inlet area defined by the one free turbine variable area inlet when the gas generator exhaust gases are being passed therethrough and to independently vary the variable area inlet of the other free turbine throughout its complete operating range,
      4. means to control the area defined by the variable area inlet of the other free turbine as the gas generator exhaust gases are being passed therethrough and to independently vary the variable area inlet of the one free turbine throughout its complete operating range.

6. A control for a convertible composite engine having a gas generator driving two free power turbines with variable area inlet and with a variable area exhaust nozzle for at least one of the power turbines including:
   A. means to regulate fuel flow to the gas generator in response to the power demands of the first of said free turbines and to simultaneously regulate the inlet area of said first free turbine in proportion to fuel flow so regulated,
   B. means to regulate fuel flow to the gas generator in response to the power demands of the second of said free turbine and to simultaneously regulate the inlet area of said second free turbine in proportion to fuel flow so regulated.

7. A control for a convertible composite engine which includes a gas generator powering two variable geometry inlet free turbines and with a variable area exhaust nozzle operatively connected with one of the free turbines including:
   A. first regulating means to regulate fuel flow to the gas generator and gas generator exhaust gas flow through the first free turbine,
   B. second regulating means to regulate fuel flow to the gas generator and gas generator exhaust gas flow through the second free turbine,
   C. means to selectively regulate fuel flow to the gas generator and gas generator exhaust gas flow through both of the free turbines.

8. A control according to claim 7 and including means to override said first regulating means in response to the demands of said second regulating means.

9. Apparatus according to claim 7 and including means responsive to one of the fuel flow regulating means to selectively position the variable area exhaust nozzle.

10. Apparatus according to claim 9 and including limiting means responsive to gas generator operating parameters to limit the flow of fuel to the gas generator.

11. Apparatus according to claim 7 wherein said second regulating means is part of a closed loop system thereby continuously regulating fuel flow for the gas generator as a function of the power output of one of the free turbines and said first regulating means is part of an open loop system so as to regulate fuel flow to the gas generator to power the other free turbine in accordance with pilot actuated inputs thereto.

12. Apparatus according to claim 7 wherein:
 A. said first regulating means includes a variably positionable first fuel regulating valve operatively connected to vary the area of the variable geometry inlet of the first free turbine in accordance with fuel regulating valve position, and
 B. said second regulating means includes a variably positionable second fuel regulating valve operatively connected to vary the area of the variable area geometry inlet of the second free turbine and to position the variable area exhaust nozzle in accordance with fuel regulating valve position.

13. Apparatus according to claim 12 wherein said fuel flow regulating valves are located in parallel fuel flow conduits.

14. A control for a convertible composite engine having a gas generator driving two free power turbines with variable area inlet guide vanes and with a variable area exhaust nozzle for at least one of the power turbines including:
 A. means to regulate fuel flow to the gas generator in response to the power output of one of the free turbines and to simultaneously position its inlet guide vanes in proportion to fuel flow so regulated, and
 B. means to regulate fuel flow to the gas generator in response to the power demands of the other free turbine and to simultaneously position its inlet guide vanes in proportion to fuel flow so regulated.

15. Apparatus according to claim 14 and including means to shut-off exhaust gas flow from the gas generator to the free turbine not in use.

16. Apparatus according to claim 14 and including means to regulate fuel flow to the gas generator in proportion to the simultaneous total power output of the free turbines and to vary the area defined by the inlet guide vanes of each turbine in proportion to the fuel flow demand thereof.

17. Apparatus according to claim 16 and including means to vary the power output of each free turbine and the fuel flow to the gas generator and the area defined by the inlet guide vanes of each free turbine in proportion to said power output.

* * * * *